Patented Oct. 5, 1937

2,094,597

UNITED STATES PATENT OFFICE 2,094,597

PROCESS FOR DYEING CELLULOSE ESTERS AND ETHERS

Emeric Havas, Pitman, N. J., assignor to E. I. du Pont de Nemours & Company, Wilmington, Del., a corporation of Delaware No Drawing. Application October 30, 1936, Serial No. 108,363

5 Claims. (Cl. 8—5)

This invention relates to a process of dyeing cellulose ester and ether material, and to certain novel compounds particularly adapted for this purpose.

It is an object of this invention to provide a novel process of dyeing cellulose acetate material, or material comprising other esters or ethers of cellulose, in yellow to orange to brown shades of good practical qualities. It is a further object of this invention to supplement the list of available colors for the purpose aforementioned by the provision of certain novel chemical compounds. Other and further important objects of this invention, will appear as the description proceeds.

I have found that compounds of the general formula

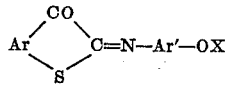

possess affinity for cellulose esters or ethers, and impart thereto vivid colors within the range of yellow to orange to brown, of good fastness qualities. In the above formula Ar stands for an ortho-arylene nucleus of the benzene or naphthalene series; Ar' represents an aryl radical of the benzene or naphthalene series having an oxy substituent preferably in position para to the nitrogen atom. This oxy substituent may be hydroxy or a lower alkoxy, and is represented in the above formula by the symbol OX, X signifying hydrogen or a lower alkyl group. In addition to these specified limitations, both nuclei Ar and Ar' may carry the customary auxochromic substituents such as lower alkoxy, hydroxy, lower alkyl, halogen, in various combinations as to kinds and positions. They should, however, be free of amino groups, whether primary, secondary or tertiary, and should contain no water-solubilizing, acidic substituents, such as sulfo or carboxy.

Typical representatives of the above general formula are contained in the examples given below. Some members of the general group may be old. But most of them are new compounds and may be synthesized by condensing a suitable thioindoxyl with a p-nitroso-phenol having the desired substituents (other than alkoxy), in alkaline, aqueous-alcoholic medium. The reaction may be represented by the following equation:

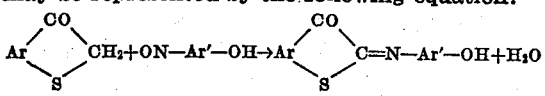

The compounds containing alkoxy groups are prepared by alkylating the corresponding hydroxy compounds.

For the purpose of dyeing cellulose ester or ether material, these compounds are suspended in aqueous medium, and dispersed by suitable dispersing agents as is customary in this art. See, for instance, Ellis, U. S. P. 1,947,038, 1,986,801 and 1,989,133, Dreyfus, U. S. P. 1,854,460 and Ackermann, U. S. P. 2,028,141. Examples of commonly used dispersing agents are: sulfonated fatty acids (Turkey red oils), sulfonated or sulfated long-chain alkyl compounds (Gardinols), alkylated naphthalene sulfonic acids, sulfonated hydrocarbons of the abietene family and the condensation product of formaldehyde and naphthalene sulfonic acid.

In general it will be understood that my invention resides in the choice of a particular family of compounds rather than in any special mode of procedure. Consequently, any and all of the expedients known in the art for promoting the dyeing of cellulose acetate material may be practiced with my invention.

It is remarkable that although U. S. P. 2,028,141 to Ackermann dealt with the same problem, and suggested the use of a number of compounds somewhat related to those of my present invention, I have found the latter to be surprisingly superior for the purpose of this invention than those of Ackermann. I have found that the presence of amino groups or alkyl amino groups in the compound apparently has a tendency to decrease the affinity of the dyestuff for cellulose ester material. The presence of an oxy group, however, such as hydroxy, methoxy or ethoxy, especially if in position para to the nitroso group, increases the affinity to a surprising degree, and gives shades exceeding in strength and brilliance anything that has heretofore been accomplished with cellulose acetate material in the color ranges above specified.

Without limiting my invention to any particular procedure, the following examples are given to illustrate my preferred mode of operation. Parts mentioned are by weight.

EXAMPLE 1

A.—Synthesis of hydroxy compound 85 parts of 6-ethoxy-thioindoxyl were dissolved in 425 parts of ethyl alcohol. 255 parts of caustic soda of 30% strength and 425 parts of water were added at 50° C. The solution thus obtained was stirred into 4000 parts of water at 40° C.

80 parts of p-nitroso-phenol solution of 75% strength were added. The mass was stirred at 40–50° C. for 1 hour. 800 parts of salt were then added, the mass was stirred for an additional 2 hours, and the precipitated product was removed by filtration. The filter cake was washed with 20% salt solution until the filtrates were colorless.

B.—Alkylation

The product thus obtained was dissolved in 4000 parts of water and 20 parts of 30% caustic soda solution at 80° C. and the solution filtered to remove insoluble impurities. The filtrate was cooled to 50° C. and 75 parts of dimethyl-sulfate were added. The mass was stirred at 50° C. until the red solution was transformed into a yellow suspension. The precipitated product was filtered off, washed with water, and dried. 88 parts of a yellow solid melting at 141° C. was obtained. The product had the probable formula:

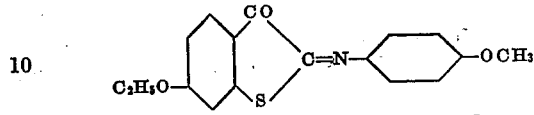

C.—Preparation of dye powder 60 parts of the above product, 85 parts of dextrine and 5 parts of lauryl sodium sulfate were mixed with a little water and subjected to viscous milling in order to produce a dispersible product. The plastic mass was dried under vacuum and ground.

D.—Dyeing of cellulose acetate

Acetate silk was dyed with this product by the following procedure:

The color was stirred with 50 parts of water and 2% of soap, based on the weight of goods to be dyed. The cellulose acetate fabric was immersed in the solution and dyed at 180° F. for 45 minutes. The printed goods then were rinsed and dried in the usual manner. The fiber was dyed to a bright yellow shade of good fastness properties.

Example 2

A.—Synthesis of color 22 parts of 6-methyl-thioindoxyl were condensed with 20 parts of p-nitroso-phenol by a process similar to that described in Example 1. 12 parts of a yellow solid, melting at 210° C. was obtained. The color had the probable formula:

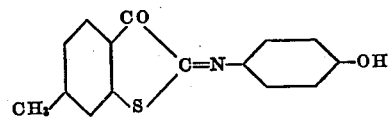

B.—Grinding of color

A mixture of 21.6 parts of the above color, 74.4 parts of dextrine and 4.0 parts of lauryl-sodium sulfate was subjected to plastic milling as in Example 1—C, in order to disperse the color.

C.—Dyeing

Acetate silk was dyed with the above product by the process described in Example 1—D. The fiber was dyed to a bright yellow shade of excellent fastness properties. In this case the shade was much redder than in Example 1.

By similar processes other thioindoxyls were condensed with nitroso compounds and acetate silk dyed with the reaction products. The following table lists colors of this type and the shades produced on acetate silk by dyeing therewith.

| Example No. | Thioindoxyl | Nitroso compound | Formula of dye | Shade on acetate silk |
|---|---|---|---|---|
| III | 6-Ethoxy-thioindoxyl | 1-Nitroso-2-naphthol | | Brown. |
| IV | 6-Ethoxy-thioindoxyl | Nitroso-thymol | | Yellow. |
| V | Thioindoxyl | p-Nitroso-phenol (methylated). | | Reddish yellow. |
| VI | 4-Methyl-7-isopropyl-thioindoxyl. | p-Nitroso-phenol (methylated). | | Yellow. |
| VII | 6-Ethoxy-thioindoxyl | Nitroso-resorcin monomethyl ether. | | Golden yellow. |
| VIII | 6-Ethoxy-thioindoxyl | Nitroso-resorcin | | Weak brown. |
| IX | Naphthioindoxyl | p-Nitroso-phenol (methylated). | | Yellow. |

It will be apparent to one skilled in the art that the above examples represent only a small proportion of the large number of compounds available or readily preparable for coloring cellulose esters and ethers according to this invention. For example, the thioindoxyl nucleus may carry other substituents such as methoxy, ethoxy, propoxy, methyl, ethyl, propyl, chloro, bromo, etc. Likewise, these radicals may be substituted on any of the available positions on the indoxyl nucleus. However, the preferred colors are obtained from 6-ethoxy-thioindoxyl Likewise, other nitroso compounds may be used provided they contain an oxy substituent and are free of amino, sulfo and carboxy groups. Examples of these, in addition to those already mentioned, are the nitroso-cresols, nitroso-xylenols and nitroso halogenated phenols, especially the chlorine and bromine derivatives. Here again the preferred colors are obtained from p-nitrosophenol. Furthermore, the hydroxyl groups present in the compounds obtained from the nitrosophenol reactants may be alkylated subsequently to the condensation with the thioindoxyls.

It will be understood, of course, that the affinity for cellulose esters and ethers will vary somewhat with the individual members of the series. But the series as a whole is possessed of remarkable affinity. The best results are obtained with compounds of fairly low melting point and good solubility in organic solvents, particularly liquid esters. On the other hand, extreme solubility is undesirable, as otherwise the color becomes not fast to washing.

The processes for condensing nitroso compounds with thioindoxyls are described in the art and need no further elaboration. Likewise, many methods of dispersing colors for cellulose esters and ethers are known and these may be applied to the colors of the present invention. Further, various methods of applying the colors to the cellulose ester and ether fibers may be used. All these minor variations are well known to those skilled in the art.

The advantages of my invention will now be readily understood. The products of the present invention find use in the dyeing of cellulose esters and ethers, usually in yellow shades varying from greenish yellows to very reddish yellows, or in brown shades. In some instances brilliant dyeings of excellent fastness properties are obtained. The intermediates for the manufacture of the colors are readily available, since the thioindoxyls are commercial products used in the manufacture of the well known thioindigo colors, while the nitroso derivatives are manufactured for many purposes.

I claim:

1. The process of dyeing material comprising a cellulose ester or a cellulose ether, which comprises applying thereto a compound of the general formula

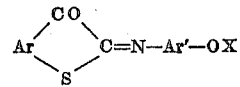

wherein Ar stands for an ortho-arylene radical of the benzene or naphthalene series, Ar' stands for an aryl radical of the benzene or naphthalene series, X stands for hydrogen or a lower alkyl group, and both the radicals Ar and Ar' are free from basic substituents and from water-solubilizing substituents.

2. The process of dyeing material comprising a cellulose ester or a cellulose ether, which comprises applying thereto a compound of the general formula

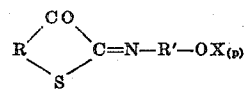

wherein R is an ortho-arylene radical of the benzene series, R' is a para-arylene radical of the benzene series, X stands for hydrogen or a lower alkyl, the group OX being substituted in the radical R' para to the N-atom, and both radicals R and R' being free from amino, sulfo and carboxy groups.

3. The process of dyeing material comprising a cellulose ester or a cellulose ether, which comprises applying thereto an aqeous suspension of a compound of the general formula

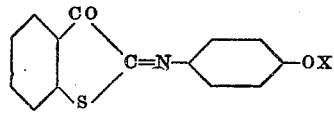

wherein X stands for hydrogen and a lower alkyl, while the undesignated positions of the phenylene nuclei are occupied by substituents selected from the group consisting of hydrogen, lower alkyl, lower alkoxy, hydroxy and halogen.

4. The process of dyeing cellulose acetate material which comprises applying thereto an aqueous suspension of a compound of the formula

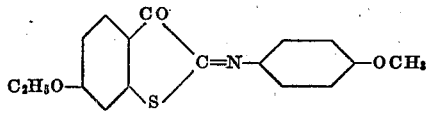

5. The process of dyeing cellulose acetate material which comprises applying thereto an aqueous suspension of a compound of the formula

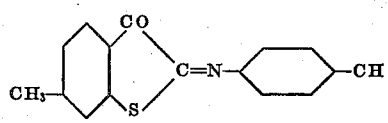

EMERIC HAVAS.